United States Patent Office 2,843,478
Patented July 15, 1958

2,843,478

HIGH TEMPERATURE BRAZING ALLOY FOR JOINING FE CR AL MATERIALS AND AUSTENITIC AND FERRITIC STAINLESS STEELS

Ronald R. Cost, Cincinnati, Ohio, assignor to the United States of America as represented by the United States Atomic Energy Commission No Drawing. Application October 28, 1957
Serial No. 692,988

1 Claim. (Cl. 75—124)

This invention relates to high temperature oxidation resistant alloys and specifically to high temperature oxidation resistant braze alloys.

An object of this invention is to provide a brazing alloy, for joining metallic components, capable of withstanding high temperatures.

Another object of this invention is to provide a brazing alloy with oxidation resistance equivalent to that of the metals being joined and in particular to provide an alloy suitable for braze joining iron-chromium-aluminum alloys.

A further object of this invention is to provide a brazing alloy capable of resisting oxidation at temperatures between 2000° F. and 2300° F.

Applicant has found that these objectives may be realized by utilizing a brazing alloy with a composition of from 19 to 20 weight percent of chromium, 5 to 6 weight percent of aluminum, 9.5 to 10.5 weight percent silicon and 1.5 to 5 weight percent phosphorus, the balance of the alloy being iron.

The alloys with compositions falling within the ranges set forth in the preceding paragraph having brazing temperatures ranging from 2100° to 2350° F., and can provide oxidation resistant joints for temperatures between 2000° and 2300° F. for times up to 500 hours. These brazing temperatures and maximum operating temperatures are largely dependent on the phosphorus content of the alloy as will be noted by reference to the attached table.

| Composition (weight percent) | | | | | Brazing Temperature, ° F. | Maximum Operating Temperature, ° F. |
|---|---|---|---|---|---|---|
| P | Al | Cr | Si | Fe | | |
| 5 | 5 | 20 | 10 | Bal. | 2,100 | 2,000 |
| 3 | 5 | 20 | 10 | Bal. | 2,250 | 2,200 |
| 1.5 | 5 | 20 | 10 | Bal. | 2,350 | 2,300 |

The brazing alloys of this composition may be prepared by melting together the proper amounts of iron, chromium, aluminum, silicon and phosphorus, thoroughly mixing the melt, and then casting and cooling the melted components. The cast material is then cleaned, crushed, and ball milled to a minus 200 mesh powder. Since these alloys are brittle at room temperature, and since they would be most difficult to fabricate into ribbon, foil, or wire, they are most advantageously used as powder.

Joint surfaces of the metals to be joined should be clean, with clearances of from .002 to .005 inch. The powdered braze alloy may be applied in any suitable manner, for example it may first be mixed with a small quantity of a cement to hold the alloy in place while handling the pieces to be brazed. The pieces are then brazed in any controlled atmosphere which is neutral or reducing in nature. The brazing temperature will be governed by the phosphorus content, as shown in the above table, and will vary between 2100° F. and 2350° F.

Sodium fluoride may be added in order to obtain maximum flow of the alloy. This flux may be added to the powdered alloy prior to application or may be painted over the braze application.

It should be understood that this invention is to be limited only by the scope of the appended claim.

I claim:

An alloy consisting of from 19 to 20 weight percent chromium, from 5 to 6 weight percent aluminum, from 9.5 to 10.5 weight percent silicon, from 1.5 to 5 weight percent phosphorus, the balance being iron.

No references cited.